Oct. 16, 1928.

S. A. HAMILONOFF 1,688,014

FROST PREVENTION DEVICE FOR WINDOWS

Filed Feb. 1, 1928    2 Sheets-Sheet 1

Inventor
Simon A. Hamilonoff

By Clarence A. O'Brien
Attorney

Oct. 16, 1928.
S. A. HAMILONOFF
1,688,014
FROST PREVENTION DEVICE FOR WINDOWS
Filed Feb. 1, 1928    2 Sheets-Sheet 2
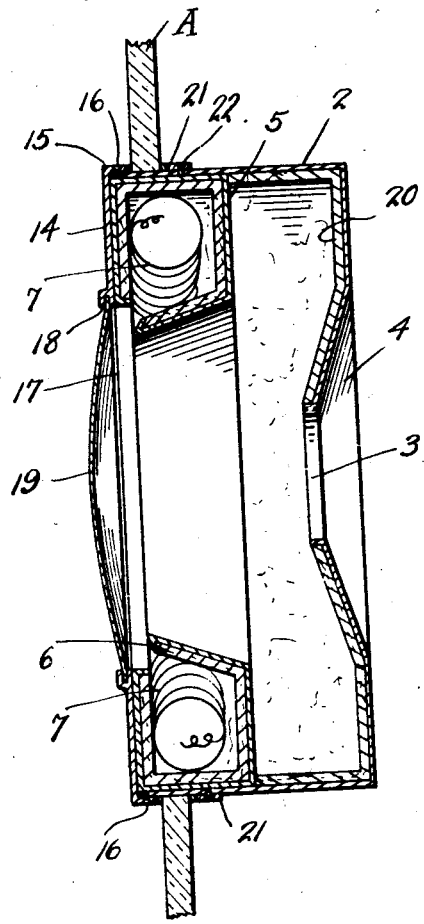
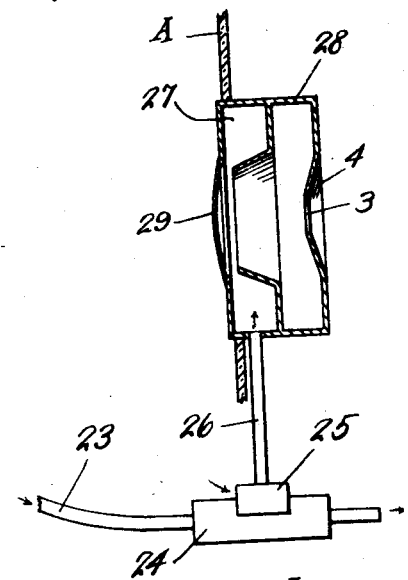
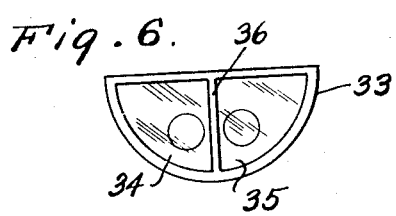
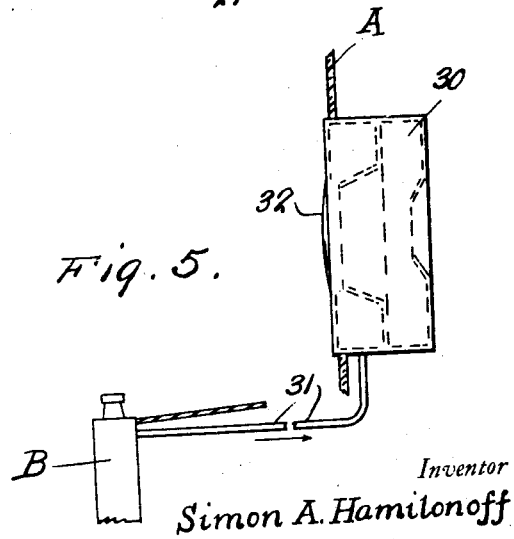
Inventor
Simon A. Hamilonoff
By *Clarence A. O'Brien*
Attorney Patented Oct. 16, 1928.

1,688,014

UNITED STATES PATENT OFFICE.

SIMON A. HAMILONOFF, OF HARTFORD, CONNECTICUT, ASSIGNOR OF TWO-THIRDS TO WILLIAM ZACHS AND JOSEPH SAFRAN, BOTH OF HARTFORD, CONNECTICUT.

FROST-PREVENTION DEVICE FOR WINDOWS.

Application filed February 1, 1928. Serial No. 251,164.

The present invention relates to improvements in frost prevention devices for windows and has reference more particularly to an attachment for a windshield of an automobile to prevent the accumulation of frost upon a portion thereof in cold weather as to obstruct the view of the driver of the vehicle.

One of the important objects of the present invention is to provide a frost preventing device of the above mentioned character which will at all times be positive and efficient in its operation, the device being of such construction as to permit the same to be readily attached to the windshield of an automobile without necessitating any material alterations of the windshield.

A still further object is to provide a frost prevention device of the above mentioned character which is simple in construction, inexpensive, strong and durable and further well adapted to the purpose for which it is designed.

Other objects and advantages of the invention will be become apparent during the course of the following description when taken in connection with the accompanying drawings.

In the accompanying drawings wherein like reference characters indicate corresponding parts throughout the same:

Figure 3 is a vertical sectional view taken approximately upon the line 3—3 of Figure 1.

Figure 4 is a diagrammatic view of a modification wherein the exhaust gases are utilized for heating the air supplied to the casing.

Figure 5 is a similar view showing a further modification wherein the steam generated in the radiators employed for heating purposes.

Figure 6 is a detail view of a modification of the shape of the casing showing the same provided with a pair of transparencies, and Figure 7 is a similar view of a further modification of the shape of the casing.

Figure 1:
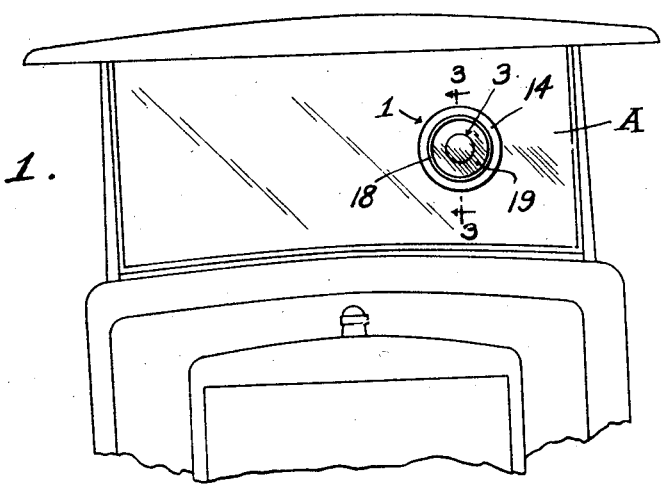
Figure 1 is a front elevation of the frost preventing device embodying my invention showing the same mounted on an automobile windshield.
Figure 2:
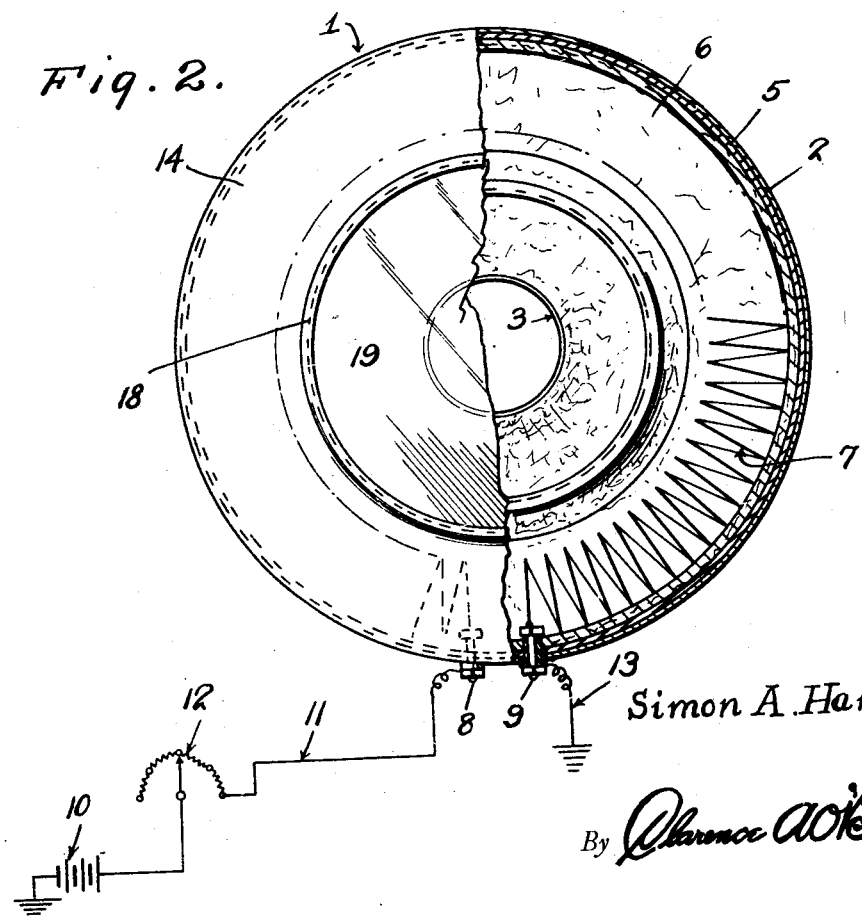
Figure 2 is an enlarged view partly in elevation and partly in section of my improved device.

In the drawings wherein for the purpose of illustration is shown the preferred embodiment of my invention with reference more particularly to Figures 1 to 3 inclusive, the numeral 1 designates generally the frost prevention device, the same including a circular metallic casing 2 that is open at its front side. The rear side of this casing is formed with a central sight opening 3 and the portion of the rear side of the casing around the opening 3 is slightly flared and is disposed forwardly for disposition within the casing as is clearly shown at 4 with reference to Figure 3.

The forward edge portion of the circular casing 2 fits within a circular opening formed in the windshield A directly in the line of vision of the operator of the automobile and as is clearly shown in Figure 3, the forward edge portion of the periphery of the casing extends outwardly beyond the front side of the windshield for a purpose to be presently described.

Adapted for disposition within the open front side of the circular casing 2 is the annular chamber 5 which is alined with asbestos or other suitable insulated material 6. This chamber 5 provides a housing for the heating unit 7 that is formed of a wire coil and the binding posts for the resistance coil are shown at 8 and 9 respectively in Figure 2, these binding posts extending through the casing and the chamber and being insulated therefrom, as illustrated in this particular figure of the drawings. One of the binding posts is connected to a suitable source of electric current 10 by the wiring 11, a regulator 12 being arranged for association with the wire 11 to control the supply of current to the heating unit. A ground wire 13 extends from the other binding post. The purpose of the heating unit 7 arranged in the chamber 5 will also be presently apparent.

A circular plate 14 of a diameter slightly greater than the outer diameter of the circular casing 2 is disposed against the front open side of the casing, and also against the front side of the annular chamber 5. An inwardly directed annular flange 15 is formed at the outer edge of the circular plate 14 for disposition upon the forward edge portion of the periphery of the circular casing 2 and suitable set screws or the like shown at 16 extend through the flange 15 and are threaded into suitable threaded openings provided therefor in the forward edge portion of the casing 2 for securing the circular plate 14 in proper position on the open front side of the casing.

This circular plate 14 is formed with an enlarged central opening 17 that is in registration with the bore of the annular chamber 5 and the inner edge portion of this ring-like member 14 is formed with an annular channel 18 in which is disposed the peripheral edge of a concavo-convex transparency 19 that is preferably constructed of mica, the concave face of the transparent material 19 being presented to the casing 2.

As clearly shown in Figure 3, the inner edge portion of the annular chamber 5 is open at the front side of the chamber whereby the heat will be directed against the inner face of the mica disc 19, thus preventing the accumulation of frost on the outer surface of the transparency so that the vision of the operator of the vehicle will not be obstructed.

The rear portion of the casing 2 is lined with asbestos as illustrated at 20 and for further securing the casing 2 against sliding movement in an outward direction with respect to the windshield A, a locking ring or band 21 encircles the casing and is secured thereto for disposition against the inner face of the windshield by suitable set screws 22. The heating unit supporting chamber will afford a means whereby the adjacent area of the windshield and the transparent member 19 will be heated when the current to the heating coil 7 is turned on so that frost cannot collect on the windshield to obstruct the vision of the driver.

In Figure 4 of the drawings there is shown a modification wherein the exhaust gases that pass through the exhaust pipe 23 and the silencer or muffler 24 may be utilized for heating air that is admitted to the manifold 25 disposed directly on top of the silencer or muffler 24 and the heated air will pass upwardly through the pipe 26 and enter the chamber 27 arranged in the casing 28 whereby to heat a transparency 29.

In Figure 5 there is shown a further modification wherein the steam generated in the upper header of the radiator B will pass into the casing 30 supported in the suitable opening provided therefor in the windshield A through the pipe 31 whereby to heat the transparent member 32 supported in the open front side of the casing 30.

In Figure 6 there is shown a modification of the casing wherein the same is of substantially semi-circular shape and this casing 33 is provided with two transparencies 34 and 35 respectively arranged on opposite sides of the partition 36.

Figure 7 discloses another shape of the casing wherein the same is of rectangular configuration. The casing in this instance being designated by the numeral 37 and the transparency is also of rectangular shape.

It will thus be seen from the foregoing description that I have provided a frost prevention device that can be readily attached to the windshield of an automobile, and the same will at all times be positive and efficient in carrying out the purposes for which it is designed.

Furthermore, the simplicity of my device enables the parts to be readily and easily assembled or disassembled and an attachment of this character can be manufactured at a very low cost.

While I have shown the preferred embodiment of my invention it is to be understood that various changes in the size, shape and arrangement of parts may be resorted to without departing from the spirit of the invention and the scope of the appended claims.

Having thus described the invention, what I claim as new and desire to secure by Letters Patent is:—

1. In a device of the class described, the combination with a window pane having an opening formed therein, a casing arranged in said opening, the same being open at its front side the rear side of the casing being provided with a sight opening, a flanged ring secured on the open front side of the casing, a transparent member mounted on the ring to provide a closure for the open center of the ring, and a heating chamber arranged in the forward portion of the casing for heating said transparent member, and preventing the accumulation of frost thereon.

2. In a device of the class described, the combination with a window pane having an opening formed therein, a casing arranged through said opening, the same being open at its front side, the rear side of the casing being provided with a sight opening, a flanged ring for disposition on the forward edge portion of the casing, the inner edge of said ring being formed with an annular channel, a transparent member having its edge portion fitted in said channel, a band encircling the casing for engagement with the inner side of a window pane to limit sliding movement of the casing in one direction, and means for heating the casing to prevent the accumulation of frost on said transparent member.

In testimony whereof I affix my signature.

SIMON A. HAMILONOFF.